Aug. 19, 1941.  M. DRAEMANN  2,253,067
PRODUCTION OF RUBBER THREADS
Filed Sept. 29, 1937

Inventor:
Max DRAEMANN
by his Attorney.

UNITED STATES PATENT OFFICE 2,253,067

PRODUCTION OF RUBBER THREADS

Max Draemann, Cologne-Deutz, Germany

Application September 29, 1937, Serial No. 166,294
In Germany October 9, 1936

7 Claims. (Cl. 18—54)

In the production of rubber threads by cutting suitably thin rolled sheets of rubber it has hitherto been necessary to vulcanise these sheets prior to cutting, as when cutting unvulcanised rubber mixes other than unmasticated latex plates, they immediately stick together again after cutting if they are not simultaneously separated from one another by applying a separating agent during the cutting step. Naturally these rubber threads obtained by cutting vulcanised plates have somewhat different mechanical properties at the cut surfaces from the properties at the other surfaces.

According to the invention, in the production of so-called cut rubber threads this disadvantage is avoided, the procedure is simplified and a high strength uniform at all surfaces is obtained by feeding the sheets from which the rubber threads are to be cut in the unvulcanised, though readily mixed and vulcanizable condition to a cutting device which is heated to the vulcanizing temperature of the rubber mix employed, so that under the action of the hot cutting surfaces the rubber threads consisting of a suitably composed vulcanizable rubber mix are vulcanised and become firm. By this vulcanisation the tendency for the initially soft unvulcanised rubber mixture which is divided into threads to stick to the hot cutting surfaces is rapidly overcome so that any local deformation or other damage to the threads, which otherwise might readily arise during the conveyance of unvulcanised rubber threads, is prevented. On leaving the cutting device the rubber threads, which will be at least superficially vulcanised no longer stick together and exhibit an independent elasticity and hardness.

In order to carry out my invention into practice I provide a method of producing rubber threads comprising the steps of preparing a vulcanizable rubber mix, manufacturing a sheet from said rubber mix, drying said sheet, passing said sheet in dry condition through a multiple cutting device to form the rubber threads, and at least superficially vulcanizing the threads during their formation in the cutting device by keeping the blades of said cutting device at a temperature not below the vulcanizing temperature of said vulcanizable rubber mix. The vulcanizable rubber mix may be of any suitable composition containing solid rubber, coagulated or natural rubber dispersions, synthetic rubber and the like. Furthermore, any desired vulcanizing agent or accelerator usual in the production of thread rubber can be incorporated in the rubber mix prior to the production of the sheet.

Due to the vulcanisation of the rubber threads at the hot cutting surfaces the cuts remain open. By way of precaution however a separating agent such as talcum or the like could be applied to the rubber sheet in front of or behind the point where the blades engage so that it is either carried into the incisions by the blades or drops by itself into the grooves behind the point of engagement of the blades.

Further it has been found, that in dividing rubber sheets with heated blades it is advantageous to adjust the peripheral speed of the blades to the speed of feed of the sheet which is to be divided, so that there is no additional friction between the blades and the sheet, or at the most only to a small extent.

In this case the blades cannot be given a direction of rotation opposed to the direction of movement of the plate, but on the other hand the heated blades can most advantageously be caused to roll on the unvulcanised plates. A lag of one or the other by a few per cent is not detrimental.

Whereas for the production of threads of masticated rubber it has hitherto invariably been necessary to vulcanise sheets and subsequently cut them, it is possible according to the invention to take the sheets directly after their production, e. g. on a calender, to divide them and in a continuous operation, i. e. immediately afterwards, to vulcanise them. In this case instead of the ordinary cutting drums, it is advantageous to provide conveyer bands on which the practically endless rolled sheets are cut.

Another mode of putting the invention into practice is as follows:

The unvulcanised sheets are not fed to a shaft carrying blades but a cutting device which has two sets of blades carried on shafts with the blades in interengagement. These blades also are heated. If the interengaging blades are so adjusted that the space lying between an upper and a lower blade corresponds to the thickness of a thread, then one thread will be urged into the gap between two blades of one unit and the next thread into the gap between two blades of the next unit, and so on alternately. The individual threads are vulcanised by the heat in the cutting device so that the vulcanised threads can be continuously taken from the cutting device.

The blades can be heated electrically or by steam or the like from the inside, or the heating can be performed externally, for example by glycerine baths or the like, or both modes of heating may be utilised simultaneously.

Also glycerine, zinc stearate, stearic acid or similar separating agents may be applied to the blades to form a thin layer thereon. In this way any adhesion of the threads to one another is avoided. Care should, however, be taken that the temperature of the blades should not drop below the specific vulcanizing temperature of the rubber mix employed.

Instead of employing inter-engaging blades carried on shafts it is possible with adequate heating to work with one shaft only, which runs on a smooth roller, so that as in the case of a shaping calender the gaps between the blades are filled with the sheet which is divided and the rubber in these gaps is vulcanised. This roller may constitute the last roller of a device for producing plates.

Further, it has been found that the rubber plates may be pre-vulcanised provided that this pre-treatment is carried only to such an extent that the plates are still plastic when they reach the blades.

If, for example, masticated rubber from the calender is employed, the sheet can be directed at once to the cutting position, but if on the other hand rubber dispersions or the like are employed, then the coagulated sheet must first pass through a drying device so that the dispersive agent or the solvent can evaporate; thereafter the sheet is fed to the cutting position where vulcanisation is effected and from which continuous threads are delivered.

Another modification resides in that for example the last roller of a calender or of an arrangement for producing rubber sheets is associated with a metal band with suitable sharp-edged grooves in place of a shaft carrying blades and this metal band passes over the said roller under pressure and perhaps with friction, so that the walls of the grooves which operate as blades subdivide the sheet which is fed in and the threads enter the grooves where they are vulcanised by the heat which is imparted to the band.

Another method of utilising the action of heated cutting blades resides in providing the last roller of an arrangement for producing rubber sheets with a layer of unvulcanised rubber or passing round it a conveyer band which carries a cutting attachment.

During the production of the sheets the drying if necessary may be effected on a roller, whereafter cutting is effected on a roller or on the conveyer band with simultaneous vulcanisation.

It has further been found that instead of utilising an elastic backing for the cutting operation, it is also possible to use a combination of blades carried on shafts, in which one shaft is provided with blades with flat edges constituting a supporting roller for the sheets which are to be divided, whereas the other shaft carries blades with sharply ground edges which engage in the supporting roller.

A similar arrangement can also be obtained with a conveyer band. It may for example be formed from a plurality of single wires of sharp-edged cross section so that the sharp-edged blades of the cutting shaft can engage between the individual wires. Equally an elastic support could be provided on a conveyer band and by means of suitable devices fine grooves can be impressed therein, the blades on the shaft engaging in these grooves.

Finally it is also possible to produce broad thin tapes of rubber in the manner described above with regard to rubber thread.

The edges of the blades and the edges of the profiled bands may be flat, sharp or of other form. They may inter-engage, or operate one on the other or one adjacent the other.

Figure 1:
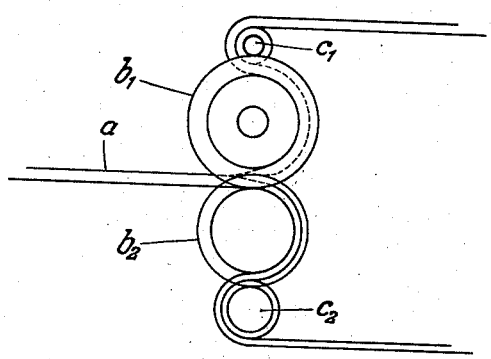
Fig. 1 is a diagrammatical side view of a cutting arrangement.

In the arrangement for producing rubber threads in accordance with the invention is shown diagrammatically in Fig. 1, a thin vulcanizable rubber sheet $a$, which, for example, may be produced on a coating machine, is divided into threads between the multiple blades $b_1$, $b_2$ carried on parallel shafts. The resultant individual unvulcanised rubber threads enter the gaps (grooves) between the individual blades and are removed by take-off rollers $c_1$ and $c_2$. As the blades are heated to the vulcanizing temperature of the rubber mix, and as the raw threads are in contact with the blades for a considerable time, as is apparent from the drawing, the threads are at least superficially, if not completely vulcanised during this time.

Figure 2:
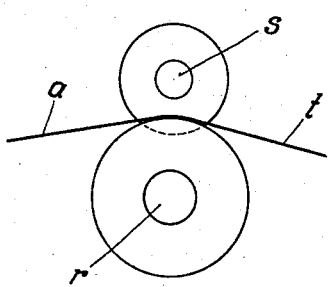
Fig. 2 is a diagrammatical side view of an arrangement similar to that shown in Fig. 1.
Figure 3:
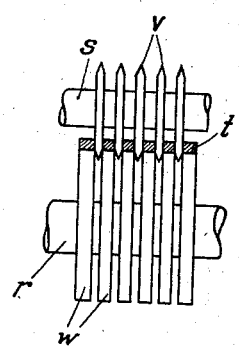
Fig. 3 is a diagrammatical front view of the arrangement shown in Fig. 2.

Figs. 2 and 3 show an arrangement with two interengaging sets of blades mounted on parallel shafts $r$, $s$. Here the rubber sheet $a$ is divided into threads between the lowermost set of blades carried on the shaft $r$, which preferably are of larger diameter, and the blades on the upper shaft $s$ and the threads are vulcanised and travel forward as continuous threads $t$.

I claim:

1. A method of producing rubber threads comprising the steps of preparing a vulcanizable rubber mix, manufacturing a substantially dry sheet from said rubber mix, passing said sheet through a multiple cutting device to form the rubber threads, and at least superficially vulcanizing the threads during their formation in the cutting device by keeping the blades of said cutting device at a temperature not below the vulcanizing temperature of said vulcanizable rubber mix.

2. A method of producing rubber threads comprising the steps of preparing a vulcanizable rubber mix, manufacturing a substantially dry sheet from said rubber mix, partially vulcanizing said sheet, passing said partially vulcanized plastic sheet through a multiple cutting device to form the rubber threads, and at least superficially completing the vulcanization of the threads during their formation in the cutting device by keeping the blades of said cutting device at a temperature not below the vulcanizing temperature of said vulcanizable rubber mix.

3. A method of producing rubber threads comprising the steps of preparing a vulcanizable rubber mix, masticating said rubber mix and manufacturing an essentially dry sheet from said rubber mix by calender rollers, passing said sheet, immediately after its delivery from the last pair of calender rollers, through a multiple cutting device to form the rubber threads, and at least superficially vulcanizing the threads during their formation in the cutting device by keeping the blades of said cutting device at a temperature not below the vulcanizing temperature of said vulcanizable rubber mix.

4. A method of producing rubber threads comprising the steps of preparing a vulcanizable rubber mix, manufacturing a substantially dry sheet from said rubber mix, passing said sheet through a multiple cutting device to form the rubber threads, and at least superficially vulcanizing the threads during their formation by keeping the blades of said cutting device at a temperature not below the vulcanizing temperature of said vulcanizable rubber mix and by keeping said blades in contact with the threads for such a period that at least the outer surfaces of the threads are vulcanized and the threads can be separated from the blades without distortion.

5. A method of producing rubber threads comprising the steps of preparing a vulcanizable rubber mix, manufacturing a substantially dry sheet from said rubber mix, partially vulcanizing said sheet, passing said partially vulcanized sheet through a multiple cutting device to form the rubber threads, and at least superficially completing the vulcanization of the threads during their formation by keeping the blades of said cutting device at a temperature not below the vulcanizing temperature of said vulcanizable rubber mix and by keeping said blades in contact with the threads for such a period that at least the outer surface of the threads are vulcanized and the threads can be separated from the blades without distortion.

6. A method of producing rubber threads as claimed in claim 1, comprising the steps of subjecting the cutting blades to a rotary movement at a peripheral speed substantially equal to the advancing speed of the sheet so as to avoid a substantial relative movement between the cutting blades and the threads during the formation of the threads.

7. A method of producing rubber threads as claimed in claim 3, comprising the steps of subjecting the cutting blades to a rotary movement at a peripheral speed substantially equal to the advancing speed of the sheet so as to avoid a substantial relative movement between the cutting blades and the threads during the formation of the threads.

MAX DRAEMANN.